United States Patent [19]
Waugh et al.

[11] Patent Number: 5,844,325
[45] Date of Patent: Dec. 1, 1998

[54] VEHICLE DUAL BATTERY CONTROLLER UTILIZING MOTION SENSOR

[75] Inventors: Iain Wallace Waugh; Paul Gary Vickery, both of Hamilton, New Zealand

[73] Assignee: Glory Win International Group Ltd., Hong Kong, Hong Kong

[21] Appl. No.: 667,237

[22] Filed: Jun. 21, 1996

[30] Foreign Application Priority Data

Jun. 22, 1995 [NZ] New Zealand ............................ 270 788
Jun. 22, 1995 [NZ] New Zealand ............................ 272 422

[51] Int. Cl.⁶ .................................................. H01M 10/44
[52] U.S. Cl. ............................ 307/10.7; 307/66; 320/117
[58] Field of Search .................................. 307/9, 1, 10.1, 307/10.6, 10.7, 46, 48, 64–66, 80, 81, 85–87; 320/5–7, 13, 15, 16, 30, 31, 32, 39, 48, 116, 117, 126, 127; 123/179.1; 290/27, 28, 30 A, 47, 36 R, 48, 38 R; 429/160

[56] References Cited

U.S. PATENT DOCUMENTS

4,883,728 11/1989 Witehira .................................. 429/160
5,264,777 11/1993 Smead ......................................... 320/6
5,488,283 1/1996 Dougherty et al. .................... 307/10.7

*Primary Examiner*—Richard T. Elms
*Attorney, Agent, or Firm*—Seidel Gonda Lavorgna & Monaco, PC

[57] ABSTRACT

A vehicle battery and controller combination having two batteries where each battery has one positive terminal cell and associated positive terminal conductor and one negative terminal cell and associated terminal conductor. Each terminal cell is independent of any other terminal cell. The controller includes a first switch capable of connecting one or more pairs of like poles of the batteries. The first switch opens to allow individual output from each battery, opens and closes to control the charging and discharging of at least one of the batteries and to preserve the state of charge of at least one battery, and closes to connect both batteries in parallel to receive charge from the alternator.

57 Claims, 7 Drawing Sheets

VEHICLE DUAL BATTERY CONTROLLER UTILIZING MOTION SENSOR

FIELD OF THE INVENTION

This invention concerns controllers used in multiple battery installations in vehicles. The controller is intended for use in vehicles and equipment with petrol or diesel motors, vessels, aircraft and other vehicles where battery failure could be undesirable or hazardous. This invention concerns switches for assisting the operation of vehicle batteries of the type where provision is made for avoiding a low state of charge (SOC) to a level where the battery system cannot start the engine.

BACKGROUND OF THE INVENTION

Wiring looms in conventional vehicle and equipment are typically suited for a single conventional battery with two poles or terminals. The alternator charging current output is connected to the positive and negative poles as there is only one battery to charge.

When a three pole battery was proposed for vehicle use, it became necessary for the controller to determine whether the alternator should charge the auxiliaries battery (AUX) or the cranking battery (CRA). Additionally if the batteries were mutually connected to be charged they had to be disconnected to preserve the all important charge in the CRA battery on which the driver relied to start the vehicle.

In our co-pending application for NZ patent #244007\247509 we described a switch intended for connection between two positive poles of a three pole battery. The controller connects the batteries in parallel to receive alternator output and disconnects them to maximise the individual outputs of the individual AUX and CRA batteries for the START. The controller prevents unsuitable discharge of the AUX battery by selective disconnection of the auxiliary loads such as air conditioning, rear window heating and headlights if these should be left on when the charging system is not operating.

Our copending application for NZ patents 264225 and 270344 describe further refinements to the above controller all of which are hereby incorporated by way of reference. The reliability of the controller depends partly upon, firstly the use of microprocessor control and secondly the selection of the values in the vehicle electrical system and in the battery itself for presentation to the microprocessor for evaluation of the state of charge.

In NZ patent application 244007\247509 we describe a controller for vehicle batteries having a CRA battery and an AUX battery. The operation of such switches and batteries are subject to the co-pending applications #264225; 270344; 270723; 270788 and are hereby incorporated. Such battery systems are referred to of the type herein described.

PRIOR ART

The provision of two batteries whether they are in one envelope or separate confer advantages but with them come problems concerning charging and discharging, battery life and ensuring that the battery system has sufficient charge to start the vehicle. These in turn depend upon assessing relationships between the batteries such as voltage differences or the assessment of the states of charge of the individual batteries or a combination of these or other measures.

WITEHIRA in U.S. Pat. No. 4,883,728 inserts a thermal switch between the positive terminals of a three pole AUX/CRA battery. The switch is normally closed but opens when excessive current heats a bimetalic strip. Different conditions and ambient temperatures lead to unreliable results.

U.S. Pat. No. 5,264,777 describes an electrical network containing an alternator that charges a pair of two pole batteries. A switch connects the batteries to the alternator and disconnects loads which one of the batteries services. The network is not suited to the changing loads of a vehicle or boat and depends on the rate of discharge of the AUX battery for its operation.

In U.S. Pat. No. 5,154,985 there is described a pair of batteries one being a smaller capacity reserve battery which is unused until the larger battery is discharged.

U.S. Pat. No. 5,243,270 describes two 12 v car batteries without any switching between them nor any means to shed auxiliary loads when this becomes necessary.

U.S. Pat. No. 5,336,932 describes two batteries with a switch between them but no provision is made to handle the discrepancy in charge when the batteries interconnect.

These references are exemplary only and more are known. Only PCT/NZ93/00067 WAUGH deals with the provision of a controller incorporating a microprocessor which assesses the state of charge and controls charge and discharge such that the discrepancy in charge between the AUX and CRA does not become too large. This art entirely concerns controller and 3-pole battery combinations.

The controller is designed to avoid the situation where there is insufficient charge in the batteries for being able to start the vehicle, whilst maximising the amount of energy available for using electrical accessories. The current outputs of the two batteries may be provided independently to the starter motor and to the other electrical systems in the vehicle. This has a number of benefits, firstly the high starter motor current does not need to be switched between the two batteries and secondly the outputs of the two batteries may be provided separately so whilst the vehicle is being started, the ignition may receive a stable voltage from one battery whilst the starter motor is drawing current from the other battery resulting in it's voltage to falling and fluctuating heavily. One battery can be discharged by electrical axuiliaries whilst the other battery is kept in a fully charged condition to start the vehicle.

The controller should be capable of operating two or more batteries that may not necessarily be of the same construction, but may be constructed differently. For example one battery may be a starter battery (CRA), and may be of a construction optimised for providing high current as is required by a starter motor for cranking the engine during starting or by preheated catalytic converters. The other battery may be a deep cycle battery, optimised to withstand intermittent discharging (AUX). The capacities of the two batteries may be the same or they may differ as they are matched to the particular requirements of the vehicle and its intended usage.

Functions of First Switch

R1 is to connect to allow the CRA battery to be electrically in parallel with the AUX battery so the CRA battery may receive charge from the alternator. R1 is to disconnect in order to mutually isolate the CRA battery from the AUX battery to prevent undesirable discharging or over charging of the CRA battery by electrical loads that are connected to the AUX battery.

R1 may connect so that the CRA battery is electrically in parallel with the AUX battery so that the CRA battery may provide electrical energy to electrical accessories if the AUX battery is in a low state of charge and is not capable of providing sufficient voltage. Usually when R1 is connected, the current that passes through R1 is low. For example during normal driving when the batteries are being charged by the alternator the current across R1 could be less than 10 amperes. In some circumstances however the two batteries may be at vastly different potential, and if R1 was connected then the current that would pass across R1 would be very high. For example if the vehicle was being started in low temperatures and the SOC of the cranking battery was low and the SOC of the AUX battery was high and R1 connected, the current through R1 may exceed 250 amperes. Large falls in voltage across switches are undesirable. They cause localised heating and deprive accessories of operating volts.

The limitations on the construction of the controller are such that the R1 may not be of sufficient current carrying capability to withstand all the current that may pass through it in all conditions. Cost and physical constraints dictate the maximum current rating of R1 that can be used, and as the controller may be built into the battery and have a life which is dictated by that of the battery thus disposability dictates that cost is a significant factor.

For example, if R1 was a relay such as a Potter & Brumfield VF7-112D which has a 70 ampere rating, in some situations if the relay were connected, the current that would pass through the relay would far exceed 70 amperes and would damage the relay. Two types of damage to the relay occur, (1) damage to the contacts of the relay from arcing as the relay makes and breaks and (2) thermal damage to the relay from large amounts of current passing through the relay over a period of time. Damage caused by arcing is avoided by preventing relay closure in anticipation of situations where arcing will occur, and thermal damage is prevented by opening the relay to prevent further current from flowing through the relay.

Connecting the relay requires approx. 170 mA of current, which while the battery is being charged is negligible, however when the battery is not being charged, 170 mA of discharge over a period of time can cause undesired reduction in SOC of the battery.

If the AUX battery and the CRA battery are both in a reasonably charged condition and they are not being charged, then connecting R1 serves no purpose. For example the AUX battery is sufficiently able to supply a stable voltage to the auxiliaries and the CRA battery is sufficiently charged to supply large amounts of current to the starter motor.

The disadvantages of connecting under these circumstances if R1 was a 70 amp relay are:

(a) Switch closure will cause discharge of battery at a rate of about 170 mA as opposed to the approximately 2 mA standby current if the relay was open. If batteries are shipped charged or stored in environments where they are prone to being triggered by external stimulus then they may suffer increased self discharge which is unnecessary and undesirable.

(b) If both batteries are in a good state of charge and charging is not present then it would be desirable to inhibit the relay from connecting. Thus if the vehicle was started, for example a large automotive internal combustion engine could draw 800 amperes of current if started in cold weather, connecting R1 would place both batteries in parallel, however the current flow through R1 could be as much as half of this current as the AUX battery would assist the CRA battery in providing current to the starter motor. Thus 400 amperes could pass through R1. This current may be in excess of R1's normal operating current and cause damage. By keeping the AUX battery separated from the CRA battery during starting, the ignition system of the vehicle will receive a stable consistent voltage supply, whilst the voltage of the CRA battery fluctuates severely as the motor is cranked. Thus starting may be improved as the ignition system receives a more stable voltage during startup. This arrangement in certain circumstances has been found to dramatically improve the starting performance of the vehicle.

(c) If the AUX battery is being discharged however its terminal voltage is still sufficiently high to power the ignition then there is no necessity to close the relay. It is desirable to preserve the charge in the CRA battery so it may be kept in reserve to provide power to auxiliaries the start the vehicle when the AUX battery is unable to provide sufficient power. This is especially true if the AUX battery is of a deep cycle construction and the CRA battery is of a high current discharge construction, because if the two batteries were placed in parallel the CRA battery would tend to provide more discharge current than the AUX battery during the initial stages of the discharge.

Thus by preventing connection of R1 under certain conditions, undesirable discharging of the CRA battery can be avoided. Excessive current passage through R1 should also be avoided.

The provision of R2 prevents the AUX battery from being fully discharged, largely eliminates the need for R1 to connect to assist the AUX battery during vehicle starting.

If R1 was closed and very high current passed through R1 it would be desirable to open R1 straight away, whereas if a lower but still excessive current was passed through R1 the duration before opening could be greater, thus R1 could be protected from excessive currents, while short term rush currents from such devices as incandescent lamps could be ignored and would not cause R1 to open.

The current detection circuit may open R1, after detecting current flow from the AUX battery to the cranking battery and determining that if R1 were open the ignition system would receive a higher and more stable voltage, this would be the case if R1 was closed during vehicle starting and the AUX battery was in a reasonable state of charge.

Furthermore it would be desirable that the method of detecting the current flow through R1 not impose a significant series resistance as this would require thermal dissipation and would also reduce the charging current to the CRA battery. For example if the series resistance between the two terminals of the batteries were 10 milliohms then a charging current of 20 amperes would result in a drop of 0.2 volts which would dramatically increase the charging time of the starter battery and 4 watts of heat would need to be dissipated within the switch.

R2 is optionally provided for disconnecting the AUX loads from the AUX battery to prevent complete discharge. The AUX battery is designed for deep cycling. Five main benefits result by incorporating R2:

1/ Electrolyte freezing is prevented.

2/ Battery life is significantly extended.

3/ The AUX battery is never discharged below 40% SOC, R1 will not connect as the AUX battery will continue to provide constant voltage to the fuel injectors and microprocessors even when the CRA battery voltage fluctuates.

4/ The risk of stratification of the electrolyte of the AUX battery is reduced.

5/ Prevents the AUX from bing fully discharged and largely eliminates the need for R1 to connect to assist the AUX battery in providing voltage to the ignition during starting.

If a single load disconnection device is used then load disconnection will only occur whilst the vehicle is stationary and the engine is not running. The art does not mention such problems nor making R1 versions work reliably.

SUMMARY OF THE INVENTION

The first aspect of this invention provides a vehicle battery and controller combination having (a) two batteries where each battery has one positive terminal cell and associated positive terminal conductor independent of any other terminal cell where each battery has one negative terminal cell and associated terminal conductor independent of any other terminal cell and (b) a controller comprising a normally open switch R1 capable of connecting one or more pairs of like poles of the batteries where R1 opens to allow individual outputs from each battery and to open and close to control the charging and discharging of at least one of the batteries and to preserve the state of charge of at least one battery The switch may have a normally closed switch R2 connecting the AUX battery to the electrical auxiliaries so as to charge both the CRA and AUX batteries and to meet fluctuating loads. The controller may include a microprocessor or ASIC (application specific integrated circuit). Alternatively the controller may include circuits which monitor values which compose the state of charge.

A second aspect of this invention provides a vehicle battery and controller combination for having an AUX battery connectable to the electrical auxiliary loads and a CRA battery connectable to the vehicles's engine starter motor and a controller comprising a normally open switch R1 capable of connecting and disconnecting one or more pairs of like poles of the CRA and AUX batteries where there is a sensing means to determine the current between the batteries where the incorporation of said means results in a voltage drop between the batteries of less than 500 mv at a current of 50 A when R1 is closed.

The controller's operation opens R1 to limit charging and prevent overcharging of the CRA battery. R1 maybe a mechanical device e.g. a latching relay, a motorised switch, an electronic device or an equivalent.

The means may be an operational amplifier which in use measures the voltage drop across a resistor of low value. The value of the resistor may be 0.10–0.0001 ohms, usefully 0.1–0001 ohms. Preferably the value would be lower than 0.018 ohms. A low resistance is desirable as it reduces the voltage drop and power dissipation.

Alternatively the means may be a Hall effect sensor. The sensor may lie within an inductive ring and produce an output voltage proportional to the current by relying on a small field. In another version the means may be a current sensing relay, whereby the current passes through some turns of heavy wire which form the coil of the relay. Within the coil is a core which causes a pair of contacts to make or break when a pre-set current is exceeded. All of these embodiments supply signals to the controller which permit the controller to manage R1 and R2.

The switch may be activated by a movement sensor for example a piezo device. An improved method of triggering the switch is an arrangement where a magnet is mounted on a copper strip suspended over a bobbin wound inductor. This device has numerous advantages over a piezo sensor as this device senses acceleration rather than vibration or noise.

This sensor outputs a voltage pulse from the coil inductor in response to acceleration which is detected by circuitry in the controller and may be used to cause relay closure.

Transit Protection

Thus the overcurrent protection (OCP as described hereinafter) which is active when R1 is connected becomes the supplementary rather than the primary means for protecting R1 from excess current. These features can be embodied relatively simply by inhibiting connection of R1 due to stimulus for example jarring during shipping, between specified voltages, for example connection of R1 could be inhibited when the AUX battery is between 10.8 and 13.0 volts. This could also be further enhances by the addition of filters and timers to take into account sudden changes in voltages and to take into account previous events in respect of new events.

For example 10.9 volts measured across the terminal of the AUX battery may indicate that it has been discharged at a low rate and is in a very low state of charge or that is being discharged at a medium current and is a medium state of charge. If the battery voltage was is the region where external stimulus was ignored while stimulus occurs, and then its voltage was reduced to being below the inhibited region within a fixed amount of time it may be advantageous to connect the R1. This algorithm is necessary if there is uncertainty of the state of charge of the AUX battery, and if the region in which connection of R1 is inhibited is large.

Implementation of the controller using discrete components can be achieved resulting in a product which is cheap to manufacture and effective. As the controllers operation can be described linguistically using few linguistic variables, it would be simple to implement the operation of the controller using "fuzzy logic", thus implementing the controller using a microcontroller or ASIC could result in significant improvements. Alternatively if an ASIC or microcontroller were used additional timers, filters or rules could be integrated into the device at low cost to improve the operation and reliability of the controller.

The switch R1 is preferably protected against the passage of excessive current by opening and remaining open for a predetermined period despite a signal from the movement detector to close. For example, if R1 was a 70 amp relay, current in excess of 70 amps may signal the controller to open R1 to prevent overheating it. Typically the delay period is 1–60 sec preferably 6 sec. A sub circuit may filter brief surges of current experienced when accessories are switched on.

The controller is designed to operate on any multiple battery system. The batteries may be a pair of side by side two pole batteries; a three pole battery with two positive poles; a pair of stacked two pole batteries; an AUX battery and a CRA battery in one multi cell case; a pair of high density batteries; a pair of batteries where one is adapted to drive the electric starter motor and the other is adapted to run auxiliaries. The batteries may be located remotely from each other, with consideration for even weight distribution and efficient use of available space. Consideration need to be given for keeping high current cabling lengths short, to keep weight and cost to a minimum.

Because this invention is designed for use in a vehicle without extensive modification, it is likely that the vehicle will only have a single alternator with a single current output. As two batteries are in the vehicle, the charging requirement of these batteries may differ. For example the SOC of the CRA battery may be high and it may not require charging, whilst the SOC of the AUX battery may be low and it may require charging. Thus it would be desirable to charge the AUX battery so it may become fully charged, however further charging of the CRA battery would only result in gassing and overcharge damage such as corrosion of the positive plates. Thus in this situation it would be desirable to open R1 to prevent overcharging of the CRA battery resulting in energy savings, reducing battery water consumption and extending battery life.

EXAMPLE A

The vehicle is driven in heavy traffic conditions using all the accessories. The load exceeds the alternator output. The controller determines that the CRA battery is discharging and opens R1 disconnecting the CRA battery from the AUX battery.

EXAMPLE B

If the vehicle is being driven, and the charging system is providing less current than the electrical demand of the vehicle, then initially the CRA battery will separate from the AUX battery to prevent the discharge of the CRA battery, however if this discharge is prolonged and the terminal voltage of the AUX battery falls below a level at which it can not provide reliable power to the electrical systems in the vehicle for example 10.5 volts, then the R1 will connect. This means that the two batteries will be mutually connected so that the vehicle will have additional energy available, and the effective useful reserve capacity available to the user when driving the vehicle is the sum of the two batteries. Thus if the alternator failed when the vehicle is being driven, the vehicle could be driven for the maximum time period before both batteries expired. However the effective reserve capacity available to the user if the vehicle is not being driven is limited to the reserve capacity of the AUX battery alone.

The controller has two switches. A relay for mutually connecting the two batteries in parallel (R1) and a switch for disconnecting the AUX loads from the AUX battery (R2) such as a latching relay. R2 may not necessarily be a single device such as a latching relay but may comprise number of switches so that individual loads may disconnected in sequence. For example high current loads may be disconnected whilst microprocessor memories may continue to be powered by the AUX battery. Alternatively if the vehicle has a serial bus, it may be possible for the battery controller to instruct specific loads to switch off. By implementing R2 using multiple disconnection devices the utility of the system may be enhanced.

EXAMPLE C

The vehicle is parked. The motor is stopped but the accessories are still on. The microprocessor looks at the SOC of the AUX battery and when the SOC of the AUX battery falls to a predetermined threshold e.g. 40% charged the microprocessor instructs relay R2 to disconnect the loads. Thus the SOC of the CRA battery is kept approximately 100% charged, and the SOC of the AUX battery is prevented from falling below 40% charged. Before disconnecting the loads the controller ensures that the vehicle is not being driven and that the engine is not running. The controller may also warn the driver prior to the disconnection of the loads.

When the driver enters the vehicle, relay R2 reconnects the auxiliaries to the AUX battery. Once the vehicle is restarted the alternator will charge both batteries.

The alternator output may be selected to prevent too high a charge which might harm the battery. The charging current is kept constant until the batteries are almost entirely charged. This may entail the charging voltage rising to 15.0 v. Thereafter the charging voltage decreases to 14.4 volts and when fully charged to 13.8 v.

Overcurrent Protection (OCP)

Battery current is supplied to a low resistance shunt (steel wire) with transistor detection of a voltage drop across the shunt. In practice a voltage drop of 0.7 v was required before the result could be used to interrupt the current. If the preferred current was 50 amperes, then 35 watts of heat would be produced at this current. This is not desirable as the heat caused by this needs to be dissipated, additionally it reduces the electrical energy available, and will reduce charging currents across the switch.

If R1 is of suitably high current rating then both batteries may be connected in parallel during starting to add the cold-cranking-amps. Once the engine cranks rapidly enough it is preferable to separate AUX and CRA. The AUX battery is free to supply improved voltage to the ignition. This assists starting. Engine cranking speed may be obtained by electronic coupling of the CRA battery voltage (or the current through R1) into a comparator to give a square wave input in the controller so it can decide when cranking peaks. Instead R1 may open after a fixed period.

Another feature of the invention provides the combination of over-current protection with a latch delay device. The purpose of such a feature is to hold the relay open thereby extending overcurrent protection by preventing response to a piezo or equivalent signal.

In use the switch permits up to 70 A to flow from the AUX to the CRA battery. This level of current can pass through the relay contacts without harming the relay. Larger currents are detected by the switch protection circuit and as soon as the threshold is exceeded the contacts open while the starter is turning.

DESCRIPTION OF THE EMBODIMENTS

Figure 1:
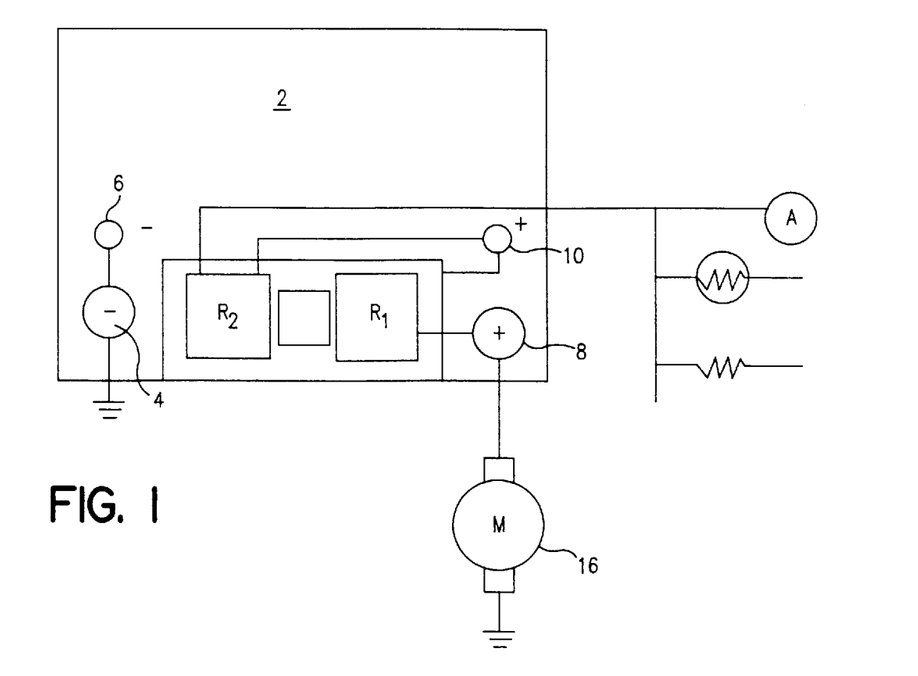
FIG. 1 is a diagram of a combined battery and switch where the switch has R1 and R2 and the connections to vehicle electrical components are shown.

In FIG. 1 a vehicle battery 2 has a large negative terminal 4, a small negative terminal 6, a large positive terminal 8 and a small positive terminal 10. A moulded cavity in the case houses a box 12 containing a microprocessor and components for the control functions described above, and relays R1 and R2. R1 is connected between the large and small positive terminals 8,10 of the AUX and CRA batteries. The negative terminals of the AUX and CRA batteries are joined and connected to an earth cable 14. The large positive terminal is connected to the starter motor 16.

Alternator 18 charges the AUX battery (terminal 10) first and if R1 is closed the CRA battery also. Whereas R1 is normally open, R2 is normally closed in order that the AUX battery can supply vehicle auxiliaries. Refinements of this version appear under the following headings.

OVERCURRENT PROTECTION (OCP) POWER SWITCH

Figure 2:
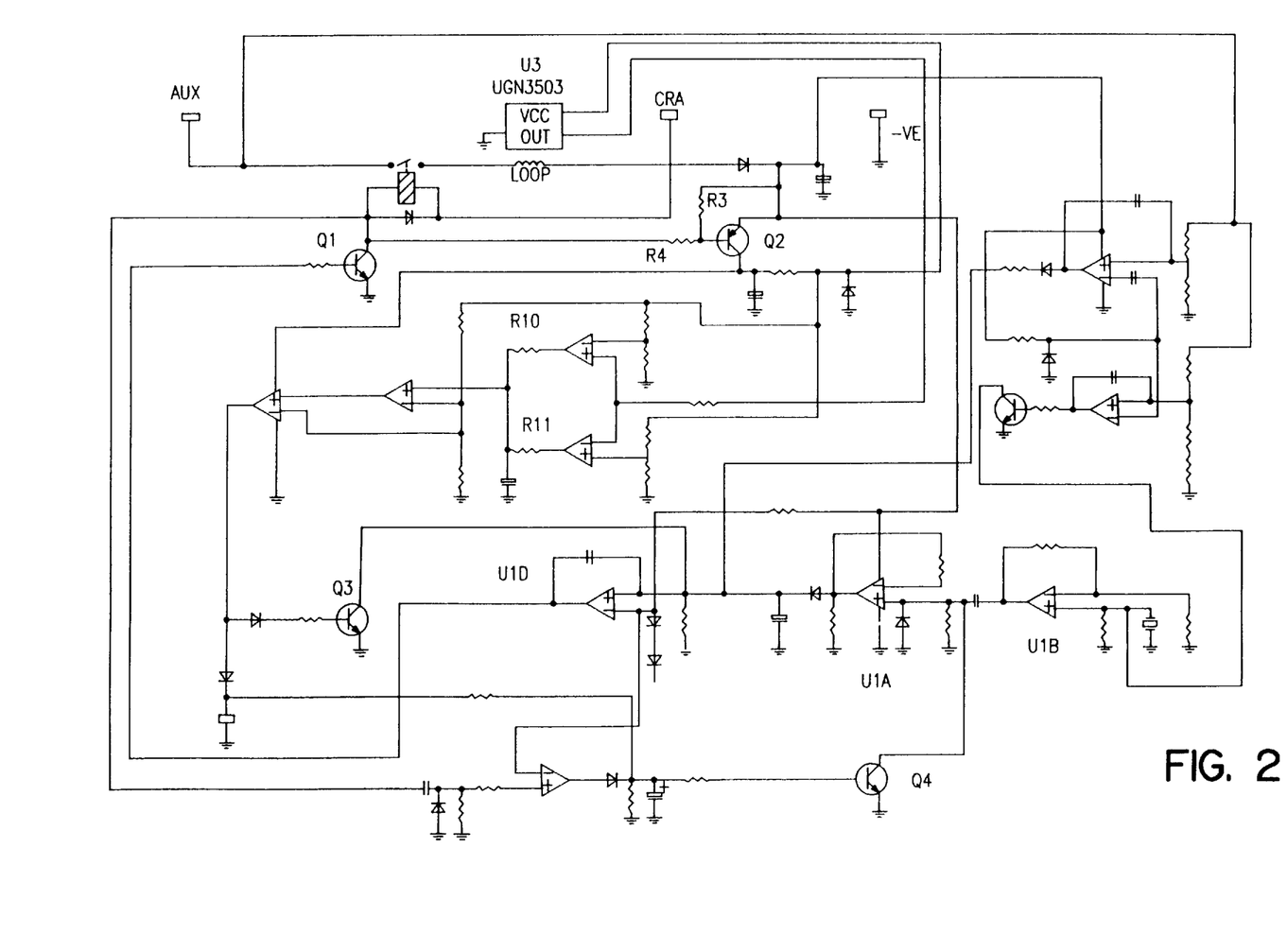
FIG. 2 is a circuit diagram of a control circuit utilising a Hall effect sensor.

Referring to FIG. 2, the switch comprises R3, R4 and transistor Q2. Its purpose is to provide power to the over current protection section of the switch when the relay is closed. When the switch is at rest and the relay is open OCP is not required. Q2 is normally held OFF by R3 pulling the base to the supply rail. The base is pulled low via R2 by the relay drive transistor Q1 when Q1 is turned on due to transistor detection by the piezo sensor. Power is then supplied to the current sensor and OCP sections.

CURRENT SENSOR

Figure 3:
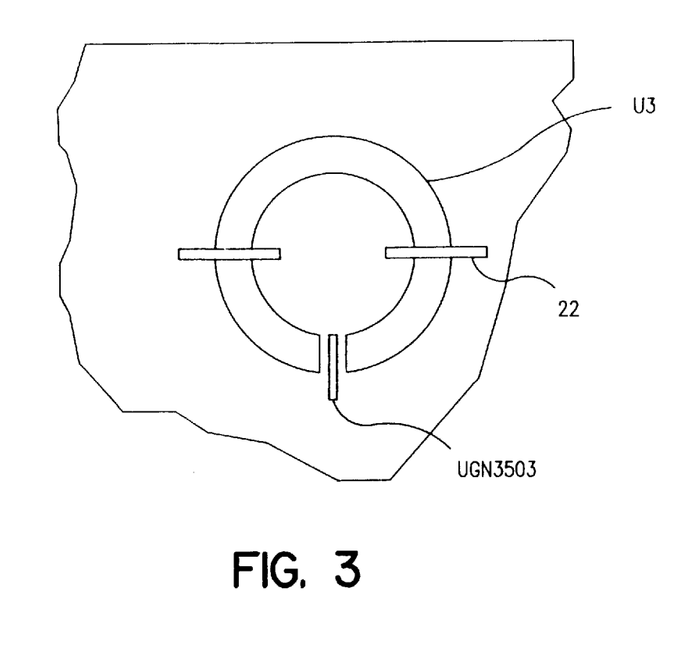
FIG. 3 is a plan of the Hall effect current sensor.
Figure 4:
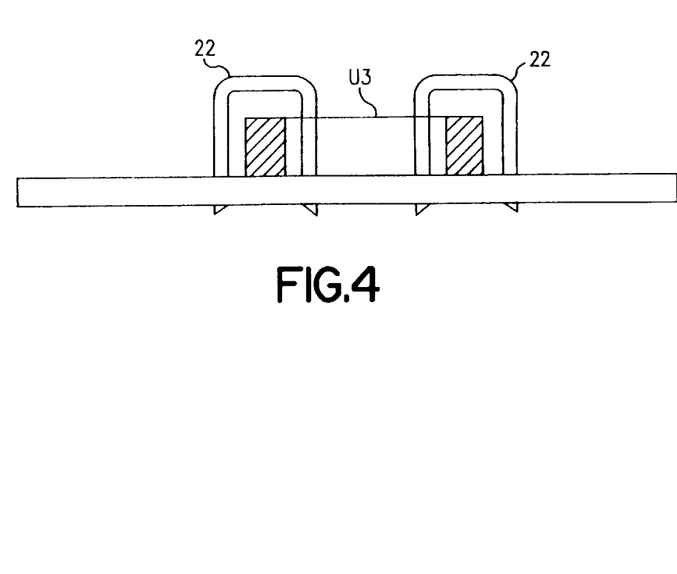
FIG. 4 is a section of the sensor of FIG. 4

In FIGS. 3 and 4 the Hall effect device is a metal ring U3 which is used to concentrate the magnetic flux generated by the current flowing in the loops 22 of wire which encircle the mild steel metal ring.

The Hall effect device is only powered when the relay R1 is closed as its supply current is about 10 mA. If given continuous power the current consumption would prematurely discharge the CRA battery. Supply voltage is determined by the zener voltage rating.

With no current passing through the relay contacts, the device outputs approximately 2.5 v. When 50 A passes from AUX to CRA via the device outputs 1.3 v and when 50 A passes in the opposite direction from CRA to AUX the device outputs about 3.8 v. Thus it follows that the voltage output versus current relationship is around 26 mV/A.

The metal ring U3 has some retentivity in that it retains a small magnetic polarisation when the current flowing through the loops 22 is removed. This is not a problem as the currents are high but the resulting hysteresis is low in proportion to the OCP trip points.

In this embodiment the loops 22 are formed by a combination of U-shaped wire links and Printed Circuit Board traces 24. This obviates the need to wrap the wire around the metal ring and then raise the assembly from the Printed Circuit Board surface. It is important for the Hall effect sensor UGN3503 to sit in the centre of the air gap and the ring. It does however mean that high current Printed Circuit Board traces can be used i.e. additional solder placed on the traces to allow them to take continuous currents of up to 50 A. Peak currents due to inrush can be as high as 80 A. The raised construction is probably more desirable if the winding of the wire around the ring and maintaining the correct stand off height is feasible in production quantities.

Figure 5:
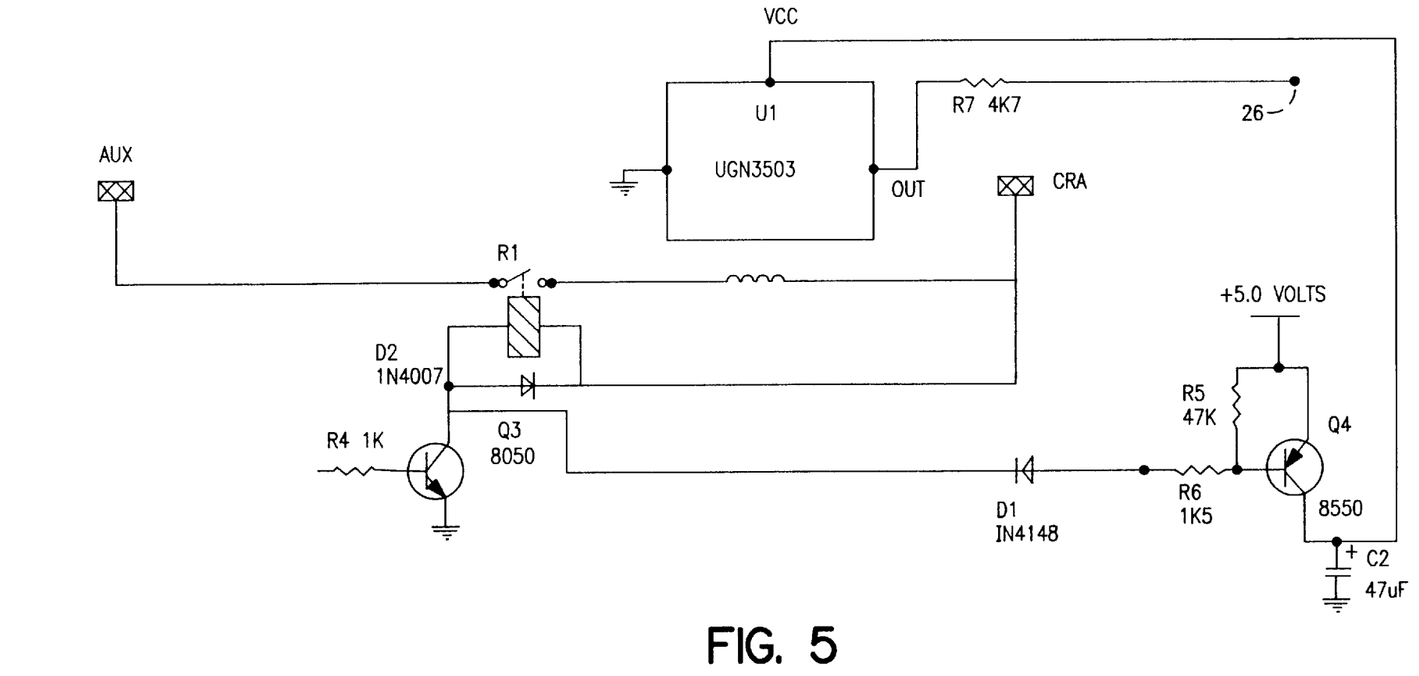
FIG. 5 is a diagram of the Hall effect sensor in circuit and capable of supplying a voltage to a comparator as shown in FIG. 6

In FIG. 5 sensor UGN3503 receives output from transistor Q4 and provides output to comparators through terminal 26.

OCP WINDOW DETECTOR

Figure 6:
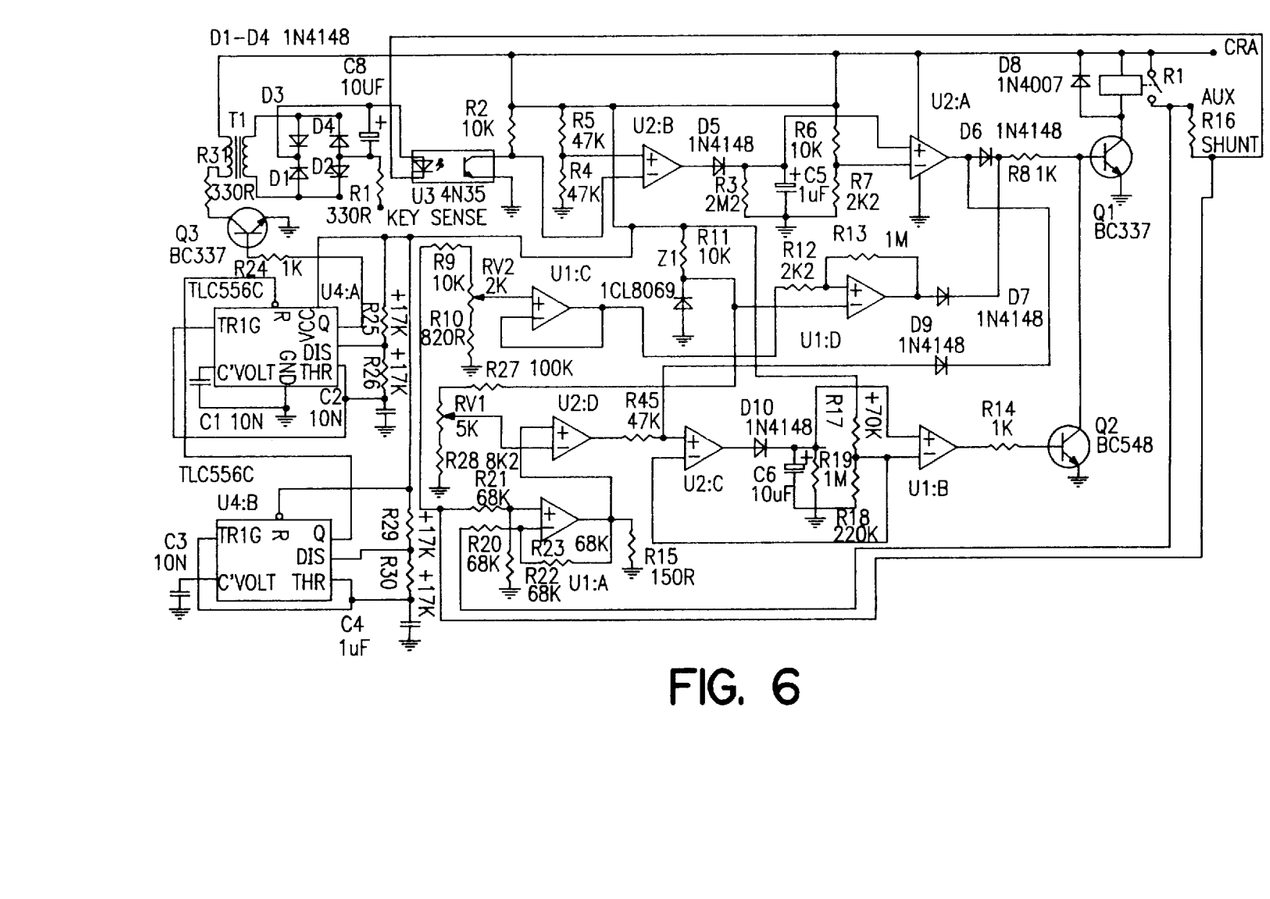
FIG. 6 is a diagram of an alternative control circuit using a shunt and opamps.

Referring now to FIG. 6 OCP window detector outputs a high voltage when the output of the current sensor exceeds predetermined levels. As described the sensor voltage is dependent on the current flowing in the relay contacts and loop.

The window detector comprises two opamp stages U2C and U2D configured as comparators. Each opamp compares the output of the current sensor with a level set by resistor divider network. As the output of UGN3503 is dependent on its supply voltage and latter is regulated only by a low cost zener diode, the positive rail of the divider networks must be derived from the same supply as the Hall effect device. This means that variations which occur due to the tolerance in the zener diode are also reflected in the divider network, negating errors due to the fluctuating zener—regulated voltage.

The set points for the comparator are set by R5 and R8 for current that flows in the CRA to AUX direction. R7 and R9 give the trip point for the current flowing from AUX to CRA.

As with the current sensor, OCP inrush filter and OCP latch sections, the supply to op-amps which form the window detector is only enabled when the relay is closed.

OCP LATCH DELAY

The OCP latch delay section is in op-amp U2b configured as a comparator. The negative input of this comparator is biased at 2.5 v by R12 and R13. The output of the inrush filter is connected to the positive input of this op-amp. When the DC level from the input filter exceeds the level set by R12 and R13 the output of the op-amp rises. This is buffered by op-amp stage U2a. The high level output from U2a turns on Q3 which immediately opens relay R1 by pulling low the input to U1d. A dwell period is introduced by D7 and C4, which in conjunction with U1c and Q4 prevent sensing of the PIEZO detector for a given dwell.

OCP INRUSH FILTER

Figure 7:
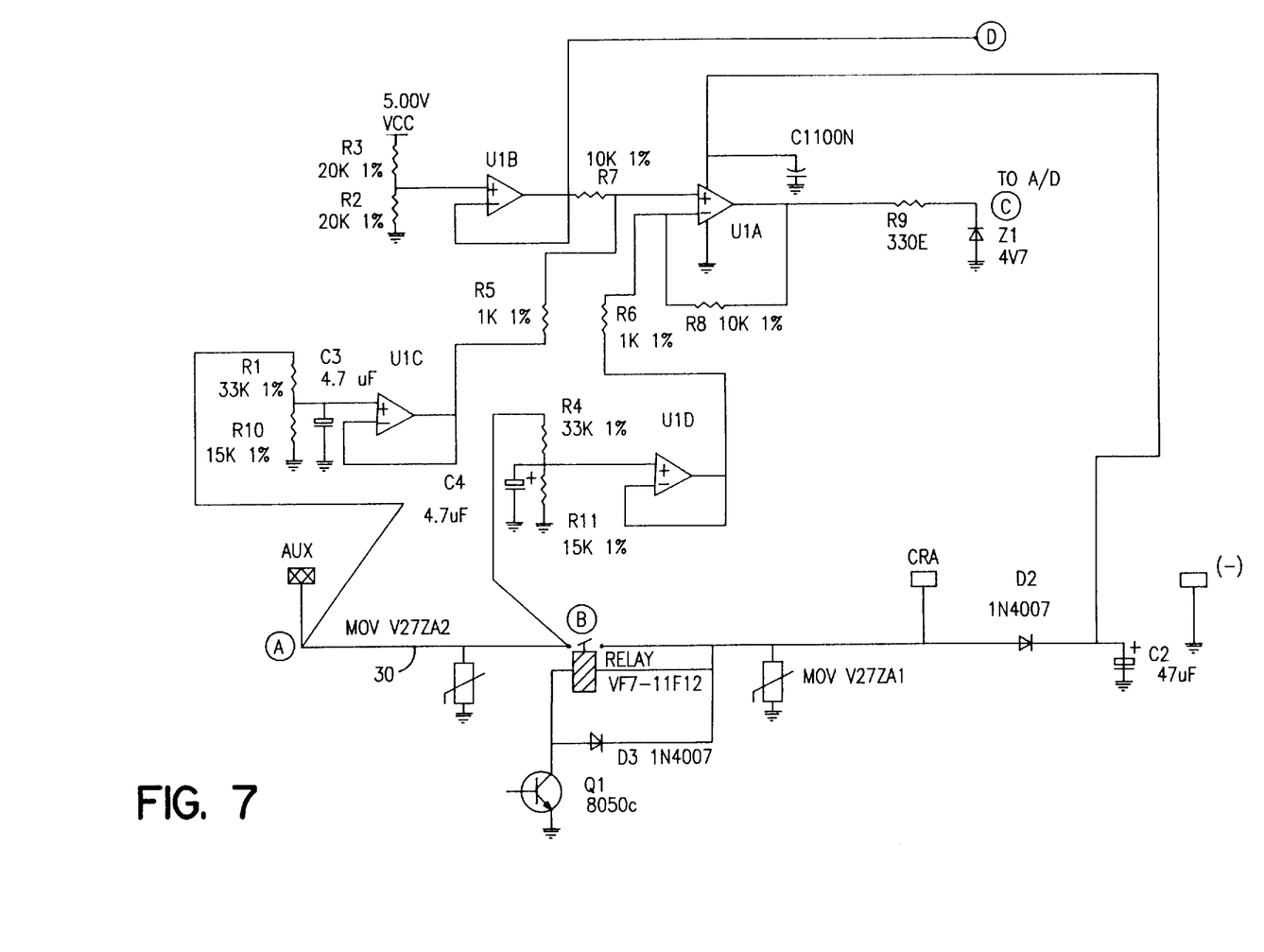
FIG. 7 is a diagram of an alternative version to FIG. 4 using a copper strip.

This comprises two resistors, R10 and R11 and capacitor C3 (see FIG. 7). These components for a simple low pass filter which prevents the OCP circuit being triggered by large current rushes caused by incandescent lamps such as vehicle headlamps. If the AUX battery has been discharged fully by leaving the headlamps on for a long period and the PIEZO detector connects relay R1 in response to driver entry, a large current will flow from the CRA battery through the relay contacts and current detection LOOP. Incandescent lamps may cause an inrush current 3 to 4 times the normal current required to operate the lamps. The current surges for only 1–2.5 seconds. The low pass filter prevents the inrush current from tripping the OCP latch delay.

In FIG. 6 the shunt R16 supplies a voltage to the OP-amps which are arranged as comparators to monitor the same. Networks in this circuit generate small, highly stable reference voltages.

COPPER STRIP VARIANT

In FIG. 7 the copper strip 30 is in series with R1. The circuit makes use of the voltage drop across this strip, the voltage drop being proportional to the amount of current flowing. The voltage drop is amplified and referenced to 2.5 volt giving a bi-directional current measuring capability.

The small amount of voltage drop must be amplified to provide enough resolution for the microprocessor to discriminate between different levels of current. The referencing to 2.5 v allows current to be measured in both directions.

U1B divides by 2 and buffers the 5.00 volt rail. This results in low impedance 2.50 Volt reference point at point D. The voltage at each end of the shunt is divided by 3.2 by (R1,R10 & R4,R11). This is done to avoid the possibility of the input voltage to u1A exceeding the supply voltage. U1C and U1D buffer the divided voltages from each end of the shunt.

Tests have shown at 50 ampere of current flowing from AUX to CRA (or CRA to AUX) the voltage difference between points A and B is approx. 40 mV.

U1A is configured as differential amplifier with a gain of 10. The equation describing out put to input can be described as follows:

$$\text{Point C (output} = (V_b - V_a) \times 10) + 2.50.$$

where
- Va is voltage at point A
- Vb is voltage at point B

1) Example if current is flowing in CRA to AUX direction at 50 amps.
- Vb=11.75 Volts
- Va=11.71 Volts
- 11.75−11.71=0.04
- 0.0.04×10=0.4
- 0.4+2.50=2.90 Volts 2) With current flowing in the opposite direction i.e. AUX to CRA then,
- Vb=11.71 Volts
- Va=11.75 Volts
- 11.71−11.754=0.04
- 0.0.04×10=0.4
- 0.4+2.50=2.10 volts From the above it can be seen a relationship between output voltage and current this can be further analysed to give Volts per Amp (V/A). If for 50 amps the voltage drop measured at points A and B is 40 mV then Volts per Amp before amplification becomes 0.008 V/A or 8 mV per Amp.

The final equation used is Current=2.50−Vc×1

$$V/A = 2.50 - Vc \times 1$$
$$0.008 = 2.50 - Vc \times 125$$

For 50 amps using example 2 above results can be confirmed

Example 2 gives Vc+2.10 Volts @ 50 amps $$2.50 - 2.10 + 0.4$$
$$0.4 \times 125 = 50.$$

The accuracy of measurement at point C is dependent on the matching of resistors R5,R6,R7 & R8. Also errors in the divide by 2 stage will be amplified by the succeeding stage. To eliminate errors as far as possible, there is a method which can be employed.

1) Auto zero

Because the calculation relies on the use of a constant of 2.50 volts to realise the current, errors can arise if the divide by 2 stage does not produce exactly 2.50 volts at point D for a 5.00 volt input. Errors at this point are due to either resistor mismatch in R2,R3, the input voltage offset of the opamp or in the divider resistors.

Using better tolerance resistors or a higher specification opamp is too expensive. Software can manage this by attempting to measure the current with the relay open. With the relay open obviously no current can be flowing in the copper strip. So an auto zero scheme can be employed which simply takes sample measurements and uses the measurement with the open relay as the constant in the current equation.

EXAMPLE

When the relay is open i.e. no current flowing, if errors in the divide by 2 stage produces 2.47 volts at point C instead of the 2.50 v as expected. Then by using 2.47 in the current equation instead of 2.50 this error can be largely eliminated.

The equation would now be Current=(2.47−Vc)×125.

Figure 8:
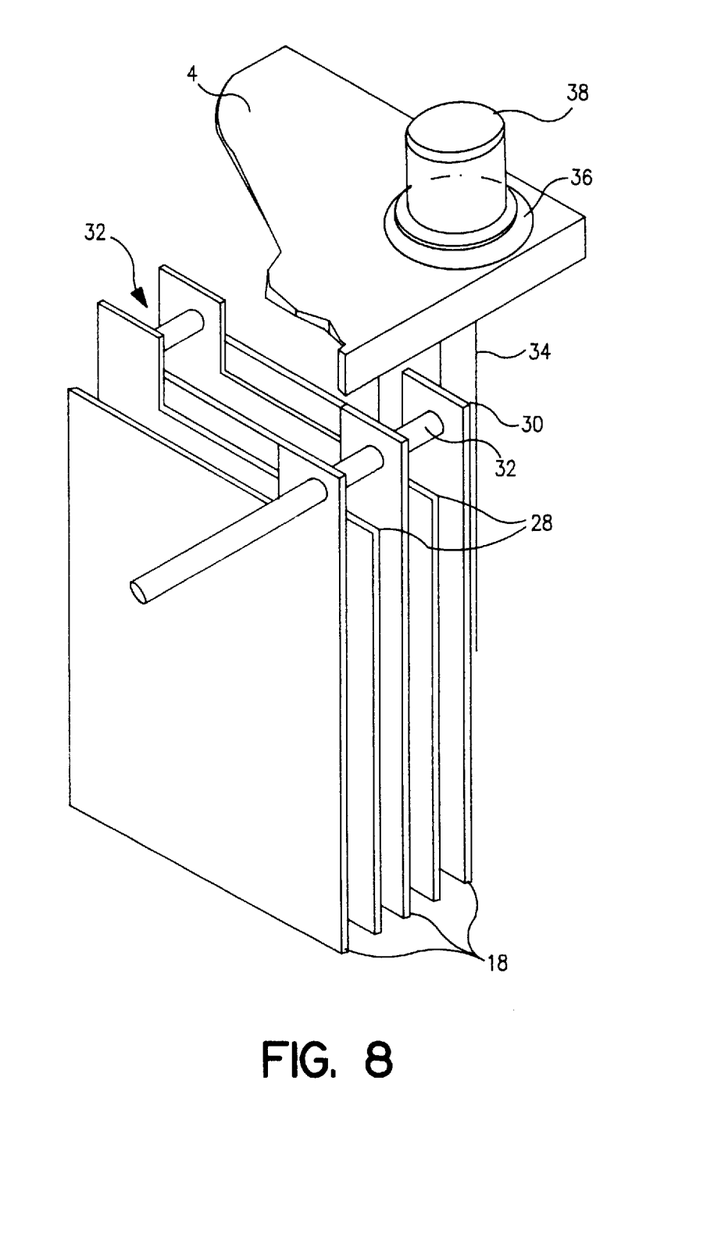
FIG. 8 is a perspective diagram of a battery plate array for a terminal cell showing the terminal conductor extending as a pole.
Figure 9:
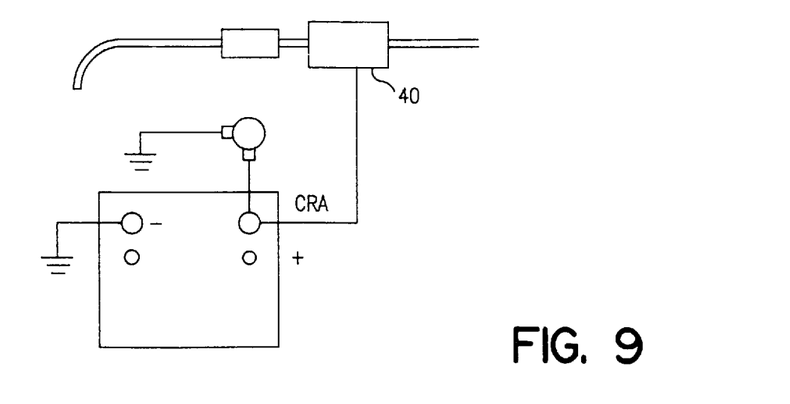
FIG. 9 is a diagram of a battery supplying two large current consuming components.

Referring now to FIG. 8, the bar 32 connects the plates 28 of the terminal cell to ascending conductor rod 34. This extends out of the case 36 as pole 38. This shows the type of battery with which our results have been obtained. In a vehicle the starter motor is usually the largest current consumer and is supplied from the CRA battery. In FIG. 9 the CRA battery also supplies a catalytic converter 40 with 100 A.

We have found the advantages the Hall effect sensor embodiment to be:

1 Hall effect sensors are cheap to provide; they reduce the need for precision components; they lower the overall parts count; they provide an electrically isolated method of sensing the current which enhances the reliability.

2 The output of the Hall effect sensor may be fed into an a/d converter as a current input which may in turn be used to help determine in combination with other SOC data.

We claim:

1. A vehicle battery and controller combination having
   (a) two batteries, where each battery has one positive terminal cell and associated positive terminal conductor independent of any other terminal cell and associated terminal conductor where each battery has one negative terminal cell and associated terminal conductor independent of any other terminal cell,
   (b) a sensor for sensing current flow between the batteries; and
   (c) a controller comprising a first switch for connecting and disconnecting at least one pair of like poles of the batteries, where the controller
      opens the first switch to allow individual outputs from each battery;
      opens and closes the first switch to control the charging and discharging of at least one of the batteries and to preserve the state of charge of at least one battery; and
      closes the first switch to connect both batteries in parallel to receive charge from the alternator;
   wherein the operation of the first switch is controlled in response to current flow between the batteries sensed by the sensor.

2. A vehicle battery and controller combination as claimed in claim 1 where one battery is a CRA battery connected to the vehicle's engine starter motor.

3. A vehicle battery and controller combination as claimed in claim 1 where one or more batteries is an AUX battery connected to electrical auxiliaries of the vehicle excluding the starter motor.

4. A vehicle battery and controller combination as claimed in claim 1 where the batteries are of different construction to each other.

5. A vehicle battery and controller combination as claimed in claim 4 where at least two batteries are of different charge and discharge characteristics from each other.

6. A vehicle battery and controller combination as claimed in claim 1 where the operation of switch R1 is determined by sensing current flow between the batteries and the voltages of the batteries.

7. A vehicle battery and controller combination as claimed in claim 1 where the sensor for sensing the current between the batteries results in a voltage drop between the batteries of less than 500 mV at a current of 50 amps when the first switch is closed.

8. A vehicle battery and controller combination as claimed in claim 1 wherein the sensor utilizes a Hall Effect current sensor located within an inductive ring.

9. A vehicle battery and controller combination as claimed in claim 1 wherein the sensor utilizes a current sensor, and the current sensor includes an operational amplifier for measuring the voltage drop across a resistor of low value.

10. A vehicle battery and controller combination as claimed in claim 1 wherein the controller includes a second switch which connects one of the batteries to auxiliary electrical loads and wherein the controller opens the second switch to preserve the state of charge of said one of the batteries when it is discharged to a predetermined level of state of charge.

11. A vehicle battery and controller combination as claimed in claim 10 wherein the second switch is an electromechanical device.

12. A vehicle battery and controller combination as claimed in claim 10 wherein the second switch selectively prioritizes disconnection of independent auxiliary loads according to predetermined threshold levels to preserve the state of charge of said one of the batteries.

13. A vehicle battery and controller combination as claimed in claim 1 wherein an overcurrent protection means is provided to prevent excessive current from damaging the first switch.

14. A vehicle battery and controller combination as claimed in claim 13 wherein the operational characteristics of the overcurrent protection means are unaffected by changes to the ambient temperature.

15. A vehicle battery and controller combination as claimed in claim 13 wherein a overcurrent protection means operates in combination with a latch delay means which holds the first switch open and extends overcurrent protection by preventing response to an activating signal for a predetermined period.

16. A vehicle battery and controller combination as claimed in claim 1 further comprising a filtering means connected in series with at least one of said batteries for filtering brief surges of current when electrical accessories are switched.

17. A vehicle battery and controller combination as claimed in claim 1 further comprising an additional sensing means for determining when the first switch should be activated.

18. A vehicle battery and controller combination as claimed in claim 17 where operation of the additional sensing means is cancelled when one battery exceeds a predetermined state of charge and is not being charged.

19. A vehicle battery and controller combination as claimed in claim 17 wherein the sensing means is a movement sensor.

20. A vehicle battery and controller combination as claimed in claim 17 wherein the sensing means is responsive to a signal originated by the vehicle operator.

21. A vehicle battery and controller combination as claimed in claim 1 where there is a sensing means to determine the state of charge of at least one battery.

22. A vehicle battery and controller combination as claimed in claim 21 wherein in determining the state of charge, the sensing means utilizes any combination of at least two values selected from current, voltage, time and temperature in determining the state of charge.

23. A vehicle battery and controller combination as claimed in claim 21 wherein the sensing means to determine state of charge utilizes a measurement of a characteristic of the electrolyte.

24. A vehicle battery and controller combination as claimed in claim 10 wherein the second switch is a mechanical device.

25. A vehicle battery and controller combination as claimed in claim 10 where switch the second switch is an electronic device.

26. A vehicle battery and controller combination as claimed in claim 1 where operation of the controller is carried out by discrete circuits.

27. A vehicle battery and controller combination as claimed in claim 26 wherein at least some of the discrete circuit is replaced with a Microprocessor.

28. A vehicle battery and controller combination as claimed in claim 26 wherein at least some of the discrete circuit is replaced by an application specific integrated circuit device.

29. A vehicle battery and controller combination as claimed in claim 1 wherein said batteries include cell posts arranged to permit the series connection of batteries of like function for the purpose of increasing voltage.

30. A vehicle battery and controller combination as claimed in claim 1 wherein the batteries are housed in a common envelope.

31. A vehicle battery and controller combination as claimed in claim 1 wherein the controller controls the current supply from the cranking battery to the vehicle starter motor and from the cranking battery to at least one other load which is smaller than the starter motor but larger than ordinary vehicle loads.

32. A vehicle battery and controller combination as claimed in claim 1 wherein one battery is connected in parallel with the other battery for starting until a predetermined condition is detected whereupon the batteries are disconnected.

33. A vehicle battery and controller as claimed in claim 32 wherein the first switch is capable of withstanding currents in excess of 100 A.

34. A vehicle battery and controller combination having an auxiliary battery connected to electrical auxiliary loads in a vehicle and a cranking battery connected to a vehicle's engine starter motor and a controller comprising a first switch for connecting and disconnecting at least one pair of like poles of the cranking and auxiliary batteries, wherein a sensing means determines the current between the cranking and auxiliary batteries, said sensing means comprising a Hall Effect current sensor located within an inductive ring, where the sensing means results in a voltage drop between the batteries of less than 500 mV at a current of 50 amps when the first switch is in a closed position.

35. A vehicle battery and controller combination as claimed in claim 34 wherein the incorporation of such sensing means results in a voltage drop between the batteries of less than 200 mv at a current of 50 amps when R1 is in a closed position.

36. A vehicle battery and controller combination as claimed in claim 34 wherein the sensing means is a current sensor, and the sensor includes an operational amplifier which in use measures the voltage drop across a resistor of low value.

37. A vehicle battery and controller combination as claimed in claim 36 wherein the value of the series resistor may be 0.1–0.005 ohm.

38. A vehicle battery and controller combination as claimed in claim 34 wherein an additional sensing means also determines when the first switch should be activated.

39. A vehicle battery and controller combination as claimed in claim 38 wherein the additional sensing means is inhibited from operating switch R1 when the auxiliary battery exceeds a predetermined state of charge and is not being charged.

40. A vehicle battery and controller combination as claimed in claim 38 wherein the sensing means is a movement sensor.

41. A vehicle battery and controller combination as claimed in claim 39 wherein the movement sensor is a piezo device.

42. A vehicle battery and controller combination as claimed in claim 40 wherein such movement sensor is a inductive sensor.

43. A vehicle battery and controller combination as claimed in claim 38 wherein the sensing means is responsive to a signal generated by the vehicle operator.

44. A vehicle battery and controller combination as claimed in claim 34 wherein a overcurrent protection means is provided to prevent excessive current damaging switch the first switch.

45. A vehicle battery and controller combination as claimed in claim 44 wherein operational characteristics of the overcurrent protection means are unaffected by changes to the ambient temperature.

46. A vehicle battery and controller combination as claimed in claim 44 wherein an overcurrent protection means works in combination with a latch delay means which holds the first switch open and extends overcurrent protection by preventing response by switch R1 to an activating signal for a predetermined period.

47. A vehicle battery and controller combination as claimed in claim 34 further comprising a filtering means connected in series with at least one of said batteries for filtering brief surges of current when electrical accessories are switched on.

48. A vehicle battery and controller combination as claimed in claim 34 where the operation of the controller is carried out by discrete circuits.

49. A vehicle battery and controller combination as claimed in claim 48 wherein some or all of the discrete circuit is replaced by a Microprocessor.

50. A vehicle battery and controller combination as claimed in claim 48 wherein some or all of the discrete circuit is replaced by an application specific integrated circuit device.

51. A vehicle battery and controller combination as claimed in claim 34 wherein the first switch is a selected one of a mechanical, electromechanical, or electronic device.

52. A vehicle battery and controller combination as claimed in claim 34 where each battery has one positive terminal cell and associated positive terminal cell conductor independent of any other terminal cell, and where each battery has one negative terminal cell and associated terminal cell conductor independent of any other terminal cell.

53. A vehicle battery and controller combination as claimed in claim 34 wherein the batteries are housed in a common envelope.

54. A vehicle battery and controller combination as claimed in claim 34 wherein said batteries include cell posts arranged to permit the series connection of batteries of like function for the purpose of increasing voltage.

55. A vehicle battery and controller combination as claimed in claim 34 wherein the controller controls the current supply from the cranking battery to the vehicle starter motor and from the cranking battery to at least one other load which is smaller than the starter motor but larger than ordinary vehicle loads.

56. A vehicle battery and controller combination as claimed in claim 34 wherein the auxiliary battery is connected in parallel with the cranking battery for starting until a predetermined condition is detected whereupon the batteries are disconnected.

57. A vehicle battery and controller combination as claimed in claim 34 wherein the disposition of the battery posts and the accommodation of the controller permit the parallel connection of batteries of like function for the purpose of increasing capacity.

* * * * *